United States Patent
Nishio

[11] Patent Number: 6,126,868
[45] Date of Patent: Oct. 3, 2000

[54] LIGHT SHIELDING DEVICE AND SHIELDING METHOD

[75] Inventor: Yoshiyuki Nishio, Hachioji, Japan

[73] Assignee: Daicel Chemical Industries, Ltd., Osaka, Japan

[21] Appl. No.: 09/112,141

[22] Filed: Jul. 9, 1998

[30] Foreign Application Priority Data

Jul. 9, 1997 [JP] Japan .................................. 9-183542

[51] Int. Cl.⁷ .............................. G02F 1/00; G02F 1/03; G02B 5/24
[52] U.S. Cl. ........................ 252/583; 359/886; 359/245; 359/296
[58] Field of Search ................... 252/582, 583; 359/886, 245, 296

[56] References Cited

U.S. PATENT DOCUMENTS

| | | | |
|---|---|---|---|
| 2,178,996 | 11/1939 | Land | 252/583 |
| 5,093,041 | 3/1992 | Check, III et al. | 252/583 |
| 5,409,734 | 4/1995 | Lee et al. | 252/583 |
| 5,615,040 | 3/1997 | Watanabe . | |
| 5,898,072 | 4/1999 | Bostrom et al. | 536/84 |

FOREIGN PATENT DOCUMENTS

| | | |
|---|---|---|
| 482533 | 4/1992 | European Pat. Off. . |
| 2-234062 | 9/1990 | Japan . |
| 6-220453A | 8/1994 | Japan . |
| 2-723471 | 3/1995 | Japan . |
| 8-027194 | 1/1996 | Japan . |
| 8-027196 | 1/1996 | Japan . |
| 8-027197 | 1/1996 | Japan . |
| 8-027198 | 1/1996 | Japan . |

OTHER PUBLICATIONS

XP–002058405, J. George et al. Pergamon, vol. 49, No. 7, pp. 873–881, (1995).

*Primary Examiner*—Philip Tucker
*Attorney, Agent, or Firm*—Birch, Stewart, Kolasch & Birch, LLP

[57] ABSTRACT

An aqueous composition comprising a polysaccharide or polysaccharide derivative (e.g. a hydroxyalkylcellulose), an electrolyte (e.g. a water-soluble inorganic salt), and an aqueous medium and having a clouding point is hermetically interposed between a pair of electrodes to produced a light shielding device. The clouding point of the aqueous composition can be controlled by adjusting the concentration of the polysaccharide or polysaccharide derivative and/or the species and concentration of the electrolyte. An electric field is applied to the electrodes to control the clouding point of the aqueous composition for selective switching from transparency to opacity or vice versa, thus causing the light shielding device to discharge its light-shielding or dimming function. The light-shielding or dimming effect is obtained regardless of changes in ambient temperature.

10 Claims, 5 Drawing Sheets

LIGHT SHIELDING DEVICE AND SHIELDING METHOD

FIELD OF THE INVENTION

The present invention relates to a light shielding device adapted to shield of f light on application of an electric field and, thus, be of use as a dimming or light-shielding or -shading means in the field of blinds, curtains, ground glass, and shutters and to a light shielding method using the device.

BACKGROUND OF THE INVENTION

Today, as light screens or shades for windows, for instance, blinds, curtains, ground glass, etc. are utilized. The dimming (or controlling) or screening means, typically blinds and curtains, are used to shield off or attenuate incident solar or other light or protect the privacy of a specific zone against visual access from the outdoor or other indoor zone by rolling down or otherwise bringing them into a barrier-wise effective position. Studies are in progress on methods for accomplishing such opening and closure in a power-aided manual mode or in an automatic mode for sophisticated control of dimming or light shielding. However, the mechanical system using a motor or the like as a power source has the drawback of unpleasant motor noise and, in addition, because of the increased scale of the equipment, the system can hardly be used universally.

Therefore, physicochemical means utilizing high-performance compound glass materials have been proposed. For example, a liquid crystal glass adapted for a modulated light transmission (transparency)/barrier (blinding) performance in response to an applied electric field has been developed. However, when a polarizer is used in combination with a liquid-crystal glass, the clarity parameter is considerably sacrificed by the polarizer to obscure the vision. On the other hand, when the polarizer is omitted, a haze is consistently omnipresent because a difference in refractive index as such is utilized.

Meanwhile, ground glass is frequently used in privacy-protecting applications, for example in the windows of a conference room or an office room. However, unlike a blind or a curtain, ground glass has no light-shielding or dimming function.

Japanese Patent Publication No. 23471/1995 (JP-B-7-23471) discloses a lyotropic liquid-crystal composition adapted to assume a cholesteric liquid-crystalline structure in the presence of a solvent which comprises a solution of a hydroxyethylcellulose in water, an organic solvent, or a mixture of water and an organic solvent.

Japanese Patent Application Laid-open No. 220453/1994 (JP-A-6-220453) discloses a liquid crystal composition comprising a lyotropic cholesteric liquid-crystal composed of a linear homopolysaccharide derivative, typically hydroxypropylcellulose, and water supplemented with 0.05 to 5 weight % of a water-soluble electrolyte and a laminate article or window produced by layering the composition on a substrate which is transparent at least in part. This literature states that the above liquid crystal composition undergoes a transition from a liquid crystal phase to a random cohesive or aggregate phase to develop opacity by scattering visible light, that addition of a water-soluble electrolyte thereto depresses the opacification temperature of the liquid crystal composition to room temperature or a temperature close to room temperature, and that an automatic switching from the transparent liquid-crystal phase to the opaque scattered phase or vice versa can be achieved with the direct solar radiation energy.

However, none of the above literatures refer to the possibility of dimming or shielding off light with an electric field. In JP-A-6-220453, in particular, the clarification and opacification of a solution are controlled by means of temperature and electrolyte concentration. However, weather changes independently of temperature so that when the proposed device is applied to a window, for instance, its opacification may result in a successful light-shielding or -screening effect in the hot summer months but no opacification may take place in the winter months, thus failing to discharge the expected light-shielding function. Moreover, there may be cases in which the window is opacified despite good weather to obscure the exterior landscape. Thus, it is difficult to let the device discharge its light-shielding function in a satisfactory way.

SUMMARY OF THE INVENTION

It is, therefore, an object of the invention to provide a light shielding (or screen) device and light-shielding (or -screening) method, with or by which the light dimming or shielding performance can be controlled.

A further object of the invention is to provide a light shielding device and a light-shielding method, with or by which the light dimming or shielding performance can be effectively and efficiently controlled despite changes in ambient temperature.

Endeavoring to accomplish the above objects, the inventor of the present invention found that when an electric field is applied to an aqueous solution containing a polysaccharide or a derivative thereof and an electrolyte at a temperature corresponding to the clouding point of the solution, a clarification/opacification control of the solution can be effectively achieved and have completed the present invention.

The light shielding device of the invention, therefore, comprises a pair of electrodes and an aqueous composition comprising a polysaccharide or polysaccharide derivative, an electrolyte, and an aqueous medium, and the aqueous composition is hermetically interposed between the electrodes. This aqueous composition has a clouding point. By applying an electric field to this aqueous composition according to the formulation of the aqueous composition and the use temperature of the device, the aqueous composition which is transparent (transparent solution) can be opacified or the composition which is opaque can be clarified. Therefore, in the method of the invention, an electric field is applied to the aqueous composition to either clarify or opacify the composition and thereby shield (or screen) or dim the incident light.

The present invention further discloses a use of the aqueous composition for a light-shielding device, and a light-shielding method which comprises applying an electric field to the aqueous composition As used in this specification, the term "clouding point-"means the temperature (° C.) corresponding to an absorbance value of 0.4 on a temperature-absorbance curve constructed as follows. Thus, the sample to be measured is hermetically sandwiched between transparent sheets of glass (sheet-to-sheet spacing: 200 $\mu$m) and while the assembly is heated at an incremental rate of about 1° C./15 min., a beam of light at a wavelength of 700 nm is projected in a direction normal (vertical direction) to the glass surface and the absorbance of the sample is measured and plotted.

DETAILED DESCRIPTION OF THE INVENTION

[Polysaccharide or its Derivative]

The polysaccharide or polysaccharide derivative for use in the light shielding device of the invention may be any polysaccharide or polysaccharide derivative only provided that it is soluble in aqueous medium and the solution shows a clouding point. As such, the polysaccharide or polysaccharide derivative mentioned above includes but is not limited to cellulose derivatives (e.g. cellulose ethers).

Cellulose derivatives include, for example, cellulose ethers, such as hydroxyalkyl-celluloses (e.g. hydroxy-$C_{1-4}$ alkyl-celluloses such as hydroxyethylcellulose, hydroxypropylcellulose, etc.), alkyl-celluloses (e.g. $C_{1-4}$ alkyl-celluloses such as methylcellulose, ethylcellulose, etc.), aralkylcelluloses (e.g. benzylcellulose, tritylcellulose, etc.), hydroxyalkyl-alkyl-celluloses (e.g. hydroxy-$C_{1-4}$ alkyl-$C_{1-4}$ alkyl-celluloses such as hydroxyethylmethylcellulose, hydroxyethylethylcellulose, hydroxypropylmethylcellulose, hydroxypropylethylcellulose, etc.), and cyanoalkyl-celluloses (e.g. cyanoethylcellulose etc.). These polysaccharides or derivatives therefrom can be used each alone or in a combination of 2 or more species.

The preferred polysaccharide or polysaccharide derivative includes but is not limited to hydroxyalkylcelluloses (e.g. hydroxypropylcellulose).

Referring, further, to the polysaccharide or polysaccharide derivative (e.g. cellulose derivatives), the average degree of polymerization and the average degree of substitution are not particularly restricted unless its solution will be too viscous and the responsiveness of the system to an electric field be adversely affected. The average degree of polymerization may for example be selected from the range of about 20 to 600, preferably about 30 to 400, and more preferably about 50 to 400. The average degree of substitution may for example be selected from the range of about 1 to 3, usually about 1.5 to 3.0, preferably about 1.5 to 2.9, and more preferably about 1.6 to 2.8.

In an aqueous composition containing such a polysaccharide or polysaccharide derivative, the polysaccharide or derivative separates out in a size of the submicron order from the aqueous solvent upon mesomorphic phase transition from a compatible phase to an incompatible phase. Therefore, the light incident on a system comprising the aqueous composition is markedly scattered so that the system attains a major light-shielding (or -screening) property. On the contrary, in the mesomorphic phase transition from an incompatible phase to a compatible phase, the polysaccharide or derivative dissolves rapidly in the aqueous solvent so that the system loses its light-screening function quickly.

The polysaccharide or polysaccharide derivative may be liquid-crystalline or isotropic at its concentration in the aqueous composition. When a liquid-crystalline polysaccharide or polysaccharide derivative, such as a cellulose derivative which is ready to form a cholesteric liquid crystal on account of the semi-rigidity and chiralty of its molecular chain, is employed, the selective wavelength reflection due to the helicoidal periodicity results in development of a brilliant color so that such a composition can be used with advantage in the interior decoration and fashion field.

The concentration of the polysaccharide or polysaccharide derivative can be judiciously selected according to the intended use temperature and is preferably selected within the range in which the mesomorphic transition of the aqueous composition containing the polysaccharide or derivative therefrom does not induce aggregation (cohesion) or precipitation. The concentration of the polysaccharide or derivative therefrom may for example be 15 to 75 weight %, preferably about 30 to 70 weight %, and more preferably about 40 to 70 weight %. The clouding point of the aqueous composition can be controlled by selecting the proper polysaccharide species and concentration. By way of illustration, when a hydroxypropylcellulose is dissolved in water at a concentration of 50 weight %, the clouding point of the resulting aqueous solution is about 30° C. Therefore, the solution is suited for use in the light shield device for service even in the neighborhood of room temperature. The aqueous solution of 62.5 weight % concentration of the hydroxypropylcellulose shows an elevated clouding point of about 36° C. The polysaccharide or polysaccharide derivative can be used generally in the form of a concentrated solution (e.g. about 45 to 70 weight %, preferably about 50 to 65 weight %).

There are two types of polysaccharide or polysaccharide derivatives, namely one of the lower consolute temperature type (LCST), the solubility of which increases with a decreasing temperature, and one of the upper consolute temperature type (UCST), the solubility of which increases with an increasing temperature. As will be described hereinafter, both types of polysaccharide or polysaccharide derivative can be used for the purposes of the invention.

[Electrolyte]

The electrolyte may be dissociable into a cation and an anion in an aqueous medium or may be a compound which is dissociated into a cation and an anion upon application of an electric field.

As the electrolyte, a polymeric electrolyte may also be used. Usually, however, a low-molecular-weight electrolyte with a high field-effect mobility, particularly a water-soluble electrolyte (e.g. an inorganic salt or an inorganic electrolyte) is used. The mass (or molecular weight) of the low-molecular-weight electrolyte may for example be not greater than 500 (about 20 to 500, preferably about 30 to 400, more preferably about 40 to 300, and particularly about 40 to 250).

The cationic component of the electrolyte may be an inorganic cation or an organic cation. The inorganic cation includes, for example, ammonium ion, alkali metal ions (Li, Na, K, Cs, etc.), alkaline earth metal ions (e.g. Mg, Ca, Sr, etc.), transition metal ions (e,. Ti, Zr, Cr, Fe, Co, Ni, Cu, Ag, Au, Cd, etc.), aluminum ion, and lanthanoid and actinoid metal ions. The organic cation includes, for example, quaternary ammonium ions, guanidinium ions, etc. The valence number of the cation species is not particularly restricted but may range from 1 to about 4. Among such cation species, inorganic cations, particularly alkali metal ions and alkaline earth metal ions are preferred. The cation species is not limited to a single species but may comprise a plurality of different ion species.

The anionic component of the electrolyte may be an inorganic anion or an organic anion. The inorganic anion includes, for example, SCN⁻ (thiocyanate ion), halide (halogen) ions (I⁻, Br⁻, Cl⁻, F⁻) and inorganic acid anions [$NO_3^-$ (nitrate ion), $SO_4^{2-}$ (sulfate ion), $ClO_4^-$ (perchlorate ion), etc.]. The organic anion includes, for example, organic acid anions [e.g. a carboxylic acid anion such as $CH_3COO^-$ (acetate ion), $C_2H_5COO^-$ (propionate ion), $CCl_3COO^-$ (trichloroacetate ion), and $CF_3COO^-$ (trifluoroacetate ion), a sulfonic acid anion such as methanesulfonate ion, ethanesulfonate ion, benzenesulfonate ion, p-toluenesulfonate ion, etc.].

Among those anion species, inorganic anions, particularly thiocyanate anions, halide anions, and inorganic acid anions, are preferred. The anion species is not limited to a single species but may comprise two or more different ion species.

The representative electrolyte includes, for example, lithium salts such as lithium thiocyanate, lithium halides (e.g. lithium iodide, lithium bromide, lithium chloride, lithium fluoride), lithium nitrate, etc. and the corresponding metal salts (sodium salts, potassium salts, cesium salts, calcium salts, etc.).

The concentration of the electrolyte in the composition can be selected from the range where application of an electric field between the electrodes induces formation of an ion gradient necessary for effective clarification/opacification control, and may for example be about 0.01 to 10 mols/liter, preferably about 0.05 to 9 mols/liter, and more preferably about 0.1 to 8 mols/liter.

The clouding point of the aqueous composition can be controlled by selecting the proper ion species and concentration for the electrolyte to be used in combination with the polysaccharide or polysaccharide derivative.

Thus, in a system where the polysaccharide or polysaccharide derivative and the electrolyte coexist in an aqueous medium, the clouding point of this aqueous composition is increased or decreased according to the ion species of the electrolyte and the behavior (plus or minus, degree) of the clouding point is apparently consistent with the series of the extent of breakdown of the cage structure of water by the concomitant ion species (e.g. chaotropic series). Taking anion species as examples, the clouding point series and chaotropic series are as follows.

Therefore, addition of thiocyanate anion SCN⁻ or iodide anion I⁻ elevates the clouding point of the aqueous composition, while addition of chloride anion Cl⁻ depresses the clouding point of the aqueous composition.

Thus, the clouding point of the aqueous composition can be shifted to the desired temperature level by adding the proper ion species. For example, when the clouding point of an aqueous composition is lower than the desired temperature, it can be elevated by adding a metal salt (e.g. Ca salt or Li salt) containing an anion having a greater chaotropic effect (e.g. SCN⁻ or I⁻). When the aqueous composition has a higher clouding point, the clouding point can be depressed by adding a metal salt (e.g. Ca salt or Li salt) containing an anion having a lesser chaotropic effect (e.g. Br⁻ or Cl⁻).

Furthermore, the clouding point can be elevated or depressed by adjusting the concentration of the electrolyte. For example, when the clouding point (about 36° C.) of a 62.5 weight % aqueous solution of a hydroxypropylcellulose is to be increased by about 10° C. with LiSCN or LiI, for instance, about 0.5 mol/liter of the former or about 1.0 mol/liter of the latter electrolyte can be added. Conversely, when the clouding point is to be lowered by about 10° C., about 0.5 mol/liter of LiCl, for instance, can be added.

[Aqueous solvent]

The aqueous solvent may be water alone or a mixture of water with a water-miscible organic solvent. The water-miscible organic solvent includes water-soluble organic solvents such as alcohols (e.g. methanol, ethanol, isopropyl alcohol, etc.), ethers (e.g. dioxane, tetrahydrofuran, etc.), ketones (e.g. acetone etc.), organic acids (e.g. acetic acid, trichloroacetic acid, trifluoroacetic acid, etc.), nitrogen-containing water-soluble solvents (e.g. trimethylamine, triethylamine, ethanolamine, triethanolamine, pyridine, etc.), nitrites (acetonitrile etc.), amides (e.g. formamide, N,N-dimethylformamide, etc.), cellosolves (e.g. methylcellosolve, ethylcellosolve, etc.), and polyhydric alcohols (e.g. ethylene glycol, polyethylene glycol, glycerol, etc.). The water-miscible organic solvent is preferably a polar solvent (an organic solvent with a high dielectric constant or permittivity). Such water-miscible organic solvents can be used as a mixture of two or more species.

In the light shielding device of the invention, the polysaccharide or polysaccharide derivative and the electrolyte coexist in aqueous medium so that the electrolyte ions are advantageously allowed to migrate fast upon application of an electric field. Therefore, the water content of the aqueous medium is preferably high and may for example be about 20 to 100 weight %, preferably about 50 to 100 weight %, and more preferably about 80 to 100 weight %.

The aqueous composition comprising the polysaccharide or polysaccharide derivative, electrolyte, and aqueous medium may be supplemented, where necessary, with various additives such as a dye, stabilizer, surfactant, antiseptic, and antifreeze.

The aqueous composition should have a clouding point so that it may induce the necessary light screening or dimming function by clarification-opacification. The clouding point of the aqueous composition can be selected according to the ambient temperature, applied electric field intensity, and intended application and may for example be about 0 to 100° C. (e.g. 0 to 80° C.), preferably about 10 to 70° C., and more preferably about 10 to 60° C. (particularly 20 to 60° C.).

[Light-shielding or dimming mechanism]

In accordance with the invention, an electric field is applied to the above aqueous composition (an aqueous composition comprising the polysaccharide or polysaccharide derivative, electrolyte, and aqueous medium and having a clouding point) to induce clarification or opacification of the composition and thereby produce a light shielding or dimming effect. The aqueous composition for the light shielding device may be a transparent solution or an opaque solution at the ambient or service temperature.

The light-barrier or -shield performance of the light shielding device varies with the solubility behavior of the polysaccharide or polysaccharide derivative, the clouding point of the aqueous composition, and the configuration or architecture of the light shield (or screen) device. The relation of the ambient or service temperature of the light shielding device with the change in the aqueous composition upon application of an electric field is now explained, assuming the clouding point of the electrolyte-free aqueous polysaccharide solution as $T_0$, the clouding point of the electrolyte-supplemented aqueous polysaccharide solution as $T_1$, and the service temperature of the device (ambient temperature) as T, for an LCST polysaccharide or polysaccharide derivative and a UCST polysaccharide or polysaccharide derivative, respectively.

Figure 1:
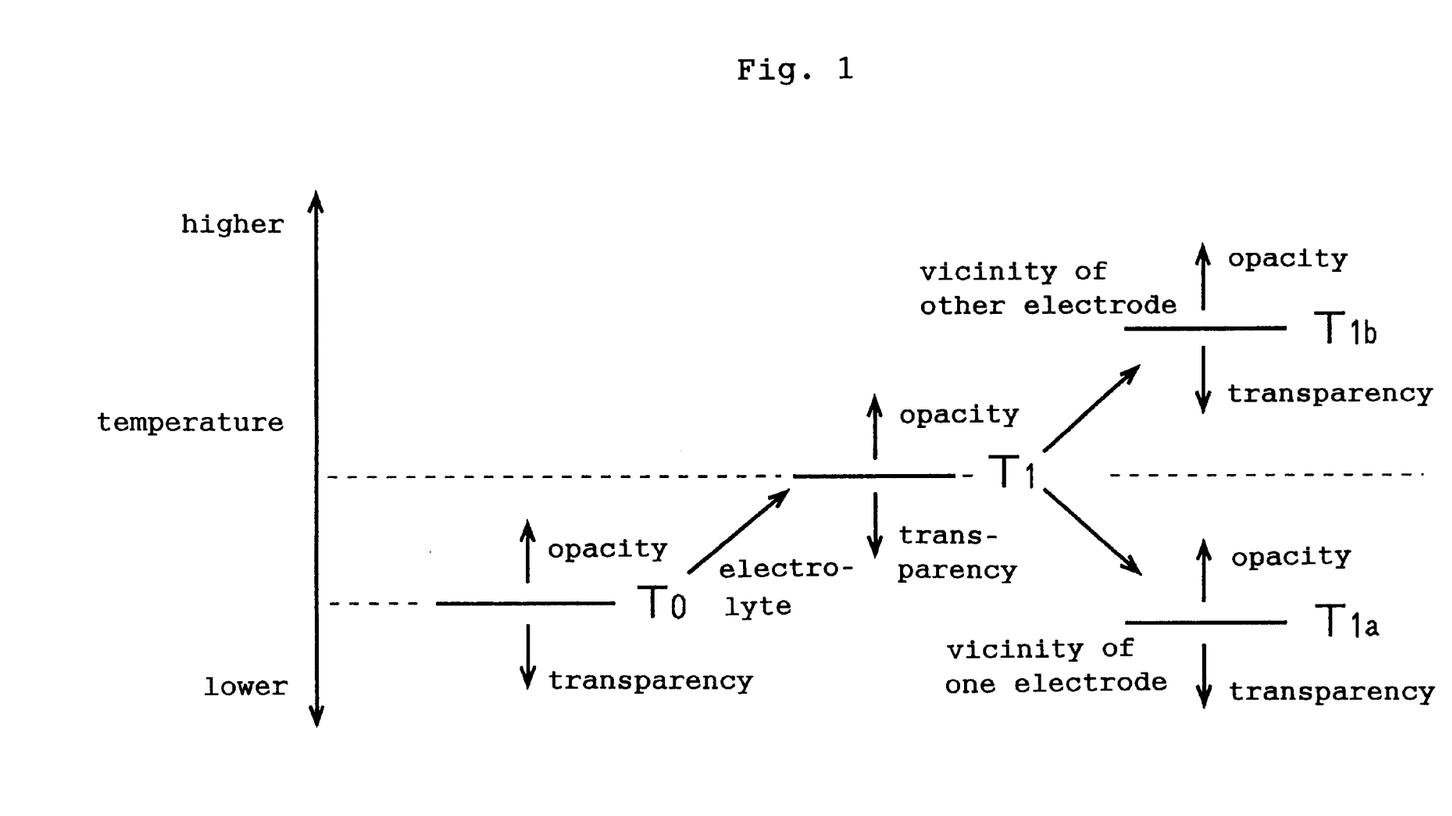
FIG. 1 is a schematic diagram illustrating a light-shielding or dimming mechanism in the light screen device utilizing an LCST polysaccharide or polysaccharide derivative.

(A) A Lower Consolute Temperature (LCST) Polysaccharide or Polysaccharide Derivative Solution (A-1) When the clouding point $T_1$ of the aqueous composition is increased beyond the clouding point $T_0$ of the aqueous polysaccharide solution ($T_0<T_1$) using an electrolyte containing an anion with a great chaotropic effect and an electric field is applied, the ions are localized so that the clouding point $T_1$ of the aqueous composition is depressed to the clouding point $T_{1a}$ in the vicinity of one of the electrodes as illustrated in FIG. 1. In the vicinity of the other electrode, the clouding point $T_1$ of the aqueous composition is elevated to the clouding point $T_{1b}$. Therefore, the relation of ambient temperature T with the change in the aqueous composition upon application of an electric field is as follows.

(1) When $T>T_{1b}$, no change (opacity)
(2) When $T_{1b}>T>T_1$, opacity to partial transparency
(3) When $T_1>T>T_{1a}$, transparency to partial opacity
(4) When $T_{1a}>T$, no change (transparency)

Figure 2:
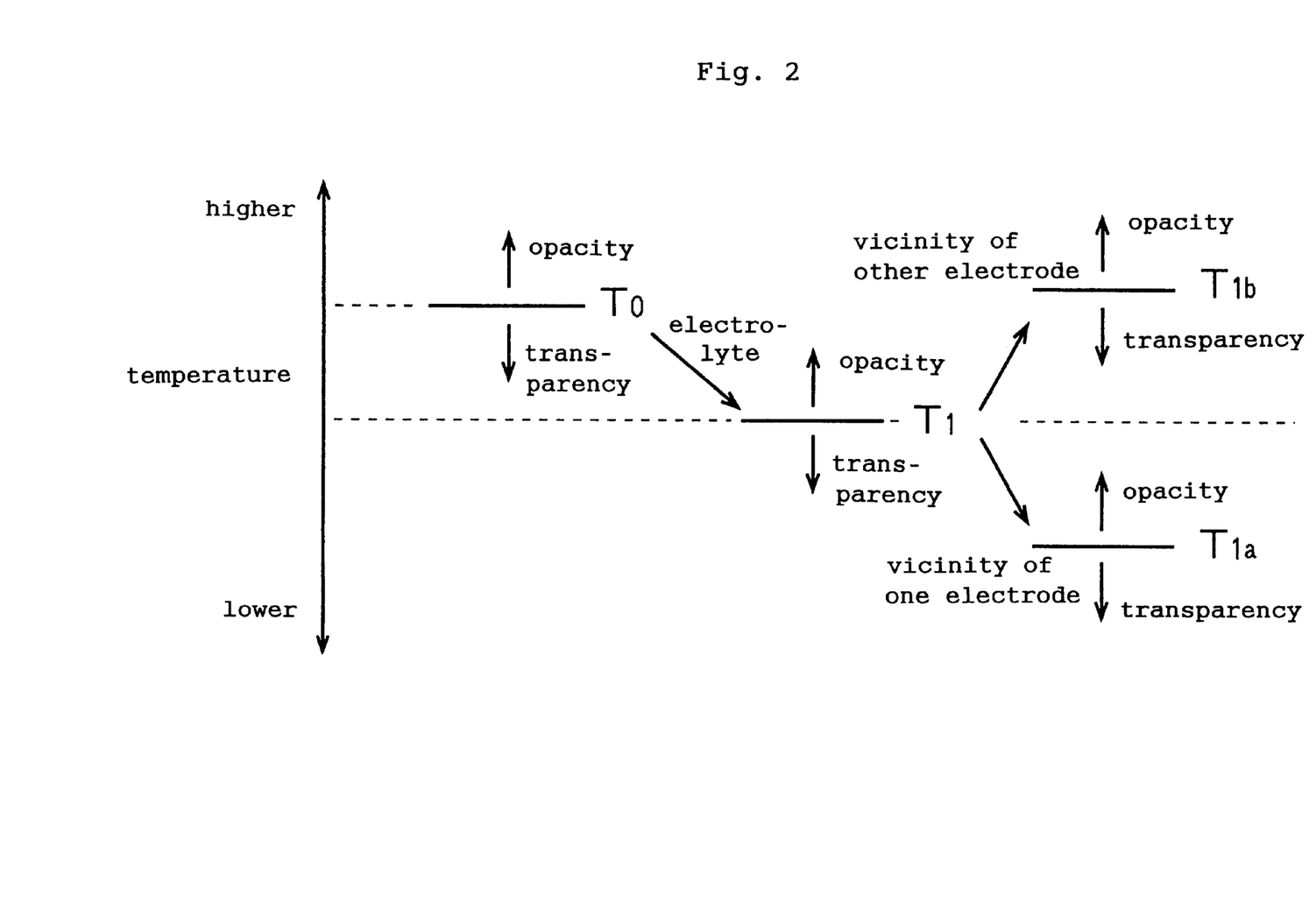
FIG. 2 is a schematic diagram illustrating another light-shielding or dimming mechanism in the light screen device utilizing an LCST polysaccharide or polysaccharide derivative.

(A-2) On the other hand, when the clouding point $T_1$ of the aqueous composition is lowered below the clouding point $T_0$ of the aqueous polysaccharide solution using an electrolyte composed of ions with a lesser chaotropic effect ($T_0>T_1$) and an electric field is applied, the ions are localized so that while the clouding point $T_1$ of the aqueous composition is depressed to the clouding point $T_{1a}$ in the vicinity of one electrode, the clouding point of the aqueous composition is elevated from $T_1$ to $T_{1b}$ in the vicinity of the other electrode, as shown in FIG. 2. Therefore, as in the case of (A-1), the relation of ambient temperature T with the change in the aqueous composition upon application of an electric field is as follows.

(1) When $T>T_{1b}$, no change (opacity)
(2) When $T_{1b}>T>T_1$, opacity to partial transparency
(3) When $T_1>T>T_{1a}$, transparency to partial opacity
(4) When $T_{1a}>T$, no change (transparency)

Figure 3:
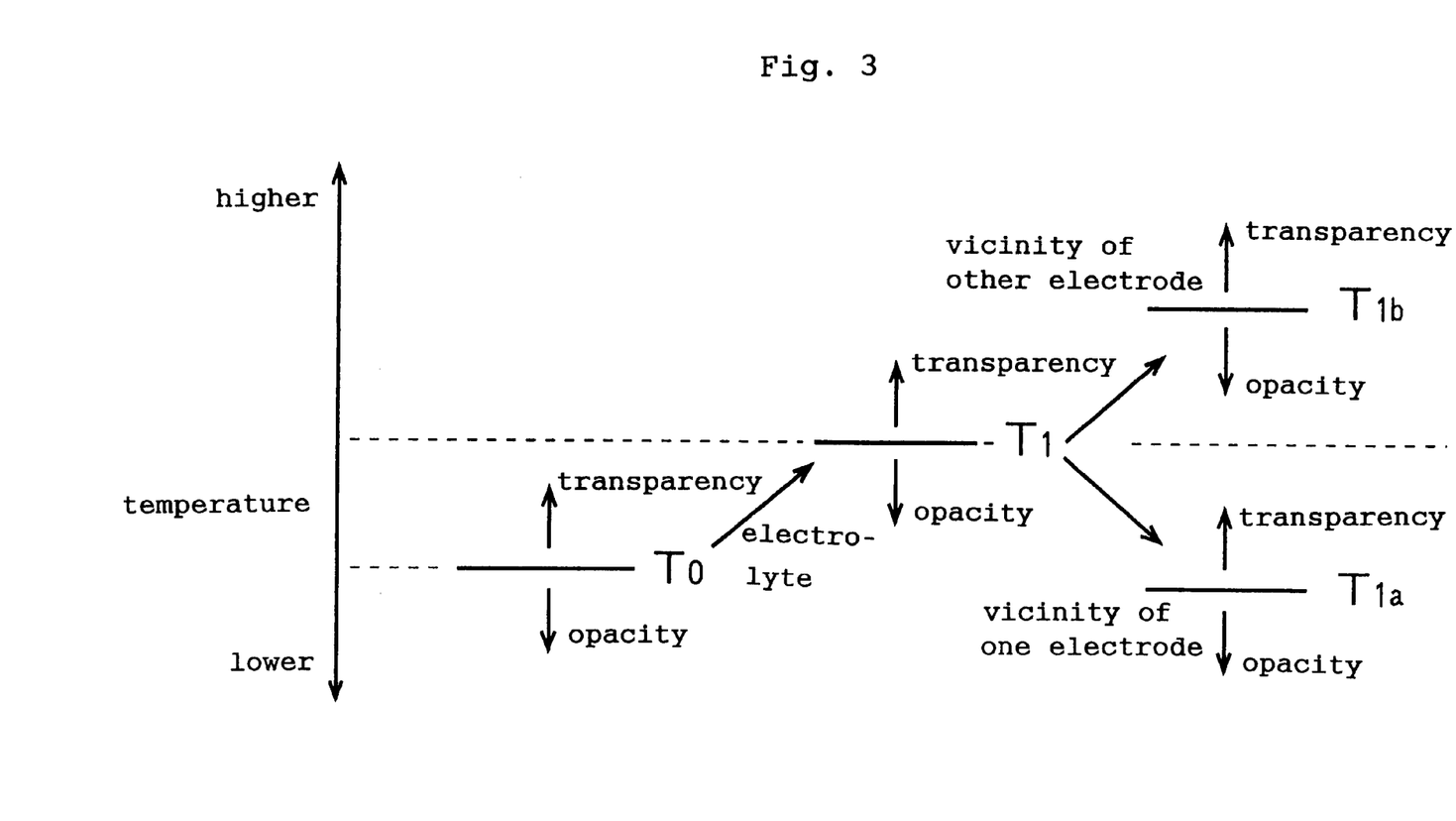
FIG. 3 is a schematic diagram illustrating a light-shielding or dimming mechanism in the light screen device utilizing an UCST polysaccharide or polysaccharide derivative.

(B) An Upper Consolute Temperature (UCST) Polysaccharide or Polysaccharide Derivative Solution (B-1) When the clouding point $T_1$ of the aqueous composition is increased over the clouding point $T_0$ of the aqueous polysaccharide solution ($T_0<T_1$) using an electrolyte containing an anion with a greater chaotropic effect, the ions are localized upon application of an electric field as shown in FIG. 3, so that, as in the case of (A-1), the clouding point $T_1$ of the aqueous composition is depressed to the clouding point $T_{1a}$ in the vicinity of one of the electrodes, while the clouding point $T_1$ of the aqueous composition in the vicinity of the other electrode is elevated to the clouding point $T_{1b}$. Therefore, the relation of ambient temperature T with the change in the aqueous composition upon application of an electric field for the UCST polysaccharide or polysaccharide derivative solution is opposite to the relation mentioned above for the LCST polysaccharide or polysaccharide derivative solution (A-1), as follows.

(1) When $T>T_{1b}$, no change (transparency)
(2) When $T_{1b}>T>T_1$, transparency to partial opacity
(3) When $T_1>T>T_{1a}$, opacity to partial transparency
(4) When $T_{1a}>T$, no change (opacity)

(B-2) When the clouding point $T_1$ of the aqueous composition is lowered below the clouding point $T_0$ of the aqueous polysaccharide solution ($T_0>T_1$) using an electrolyte containing an anion with a lesser chaotropic effect, the relation of ambient temperature T with the change in the aqueous composition upon application of an electric field for this upper consolute temperature (UCST) polysaccharide or polysaccharide derivative solution (see FIG. 4) is opposite to the above-described relation for the LCST polysaccharide or polysaccharide derivative solution (A-2), as follows.

Figure 4:
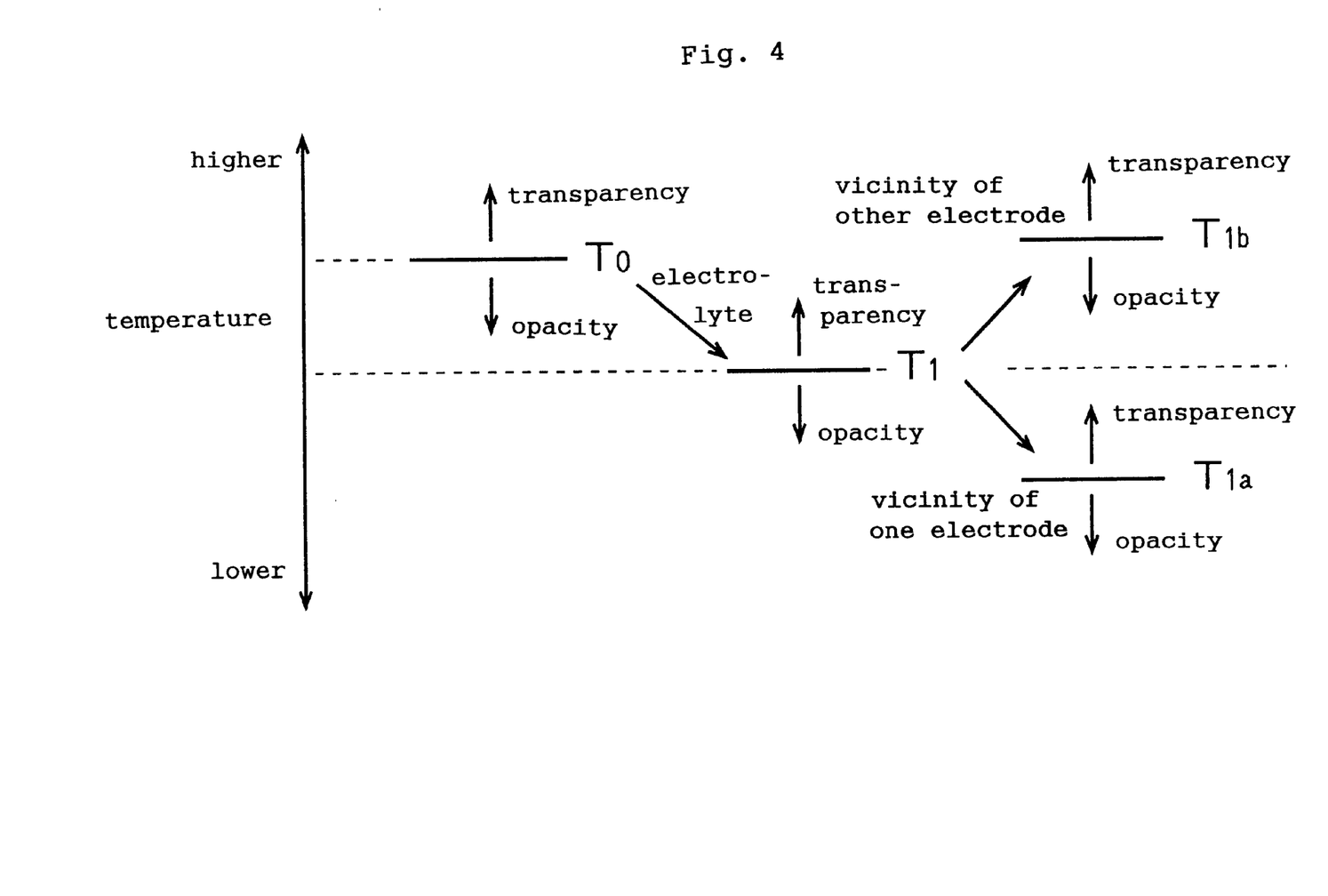
FIG. 4 is a schematic diagram illustrating another light-shielding or dimming mechanism in the light screen device utilizing a UCST polysaccharide or polysaccharide derivative.

(1) When $T>T_{1b}$, no change (transparency)
(2) When $T_{1b}>T>T_1$, transparency to partial opacity
(3) When $T_1>T>T_{1a}$, opacity to partial transparency
(4) When $T_{1a}>T$, no change (opacity)

It will be apparent from the above relations that regardless of the solubility characteristics (LCST or UCST) of the polysaccharide or polysaccharide derivative and the elevation or depression of the clouding point due to addition of an electrolyte, application of an electric field induces a change in the condition of the aqueous composition (transparency or opacity) in the temperature range of $T_{1b}>T>T_{1a}$. Thus, the light barrier function of this light shielding device can be controlled with an electric field in the above-mentioned temperature range.

The above aqueous composition is hermetically interposed between a pair of electrodes to construct a light shielding device or light dimmer device. Thus, the light shielding device of the invention may comprise (i) a pair of transparent electrodes, a spacer interposed between the electrodes, and the aqueous composition hermetically interposed between the electrodes, or (ii) a pair of transparent substrate sheets, a pair of electrodes functioning as spacer means as interposed between the substrate sheets, and the aqueous composition hermetically interposed between the substrate sheets. Furthermore, the light shielding device or dimmer device may be a single cell or be a matrix comprising a plurality of cells. In addition, the actuation (application of a voltage) of the cells forming the matrix may be respectively effected by the respective control circuits.

The light shielding device has a suitable light-shielding or dimming area, where a phase transition from transparency to opacity or vice versa occurs, in accordance with the layout or arrangement of the electrodes and substrate sheets. In the above construction (i), the transparent electrode may be the light-shielding or dimming area. In this construction (i), (a) an overall switching from transparency to opacity or vice versa and control of the degree of opacification, and (b) an overall switching from intense opacity to moderate opacity or vice versa can be effected. The former mode (a) corresponds to the above-mentioned light-shielding mechanisms (A-1) (3), (A-2) (3), (B-1)(2), and (B-2)(2) and can be used effectively in applications where the solar radiation is to be attenuated as it is the case with a lace curtain, or in application for windows where a switching from the ground glass texture to the transparent glass texture or vice versa is required. The latter mode (b) corresponds to said light-shielding mechanisms (A-1)(2), (A-2)(2), (B-1)(3), and (B-2)(3), and can be effectively used in applications where the solar radiation incident on a window is to be stepwise attenuated.

In the above construction (ii), the transparent substrate sheet can be used as the light shielding or dimming area. In this case, the transparent substrate sheet may be (c) totally exposed or (d) only locally exposed in the light-shielding area (e.g. an area close to the electrode), i.e. the area of the transparent substrate sheet where a mesomorphic phase transition (transparency or opacity) takes place, by means of a cover member. In the latter mode (d), the light-shielding area can be switched from transparency to intense opacity or vice versa by application of an electric field. Therefore, this mode is suitable for shutter and other applications.

Thus, the clouding point of the polysaccharide or polysaccharide derivative solution, the electrolyte-induced shift of the clouding point, device configuration or architecture, and service or ambient temperature conditions are closely associated with the light-shielding or dimming function according to the invention. Therefore, the direction and degree of shift of the clouding point as induced by an electrolyte can be selected, with using the clouding point of the electrolyte-free polysaccharide or polysaccharide derivative solution as a reference, according to the particular architecture and service temperature of the light shielding device.

In the light shielding device, the electrode gap, i.e. electrode-to-electrode distance, can be judiciously selected according to the device architecture, for example from the range of about 50 μm to 200 mm (e.g. about 50 μm to 10 mm in the construction (i) or about 5 to 200 mm in the construction (ii)).

The application voltage can be selected with reference to the electrode gap, among other parameters, and may for example be about 0.01 to 100 V, preferably about 0.01 to 50 V, and particularly about 0.05 to 10 V. The voltage may be a direct-current voltage.

The intensity of the electric field formed between the electrodes may for example be selected from the range of about 0.01 to 10 V/mm (preferably 0.1 to 1 V/mm).

The polarity of the electrodes may be switchable. The number of electrode terminals provided in the light shielding device may be 3 or more.

The light shielding device of the invention can be used not only in the conventional light-shielding or -screening applications (e.g. curtains, blinds, windows, etc.) but also in other fields such as display devices or panels, labels, and toys.

In accordance with the invention, the dimming or light-shielding function of the device can be effectively controlled by applying an electric field to the herein-disclosed aqueous composition. Particularly, even when the ambient temperature changes, the dimming or light-shielding function can be effectively and efficiently controlled.

EXAMPLES

The following examples are intended to illustrate the present invention in further detail and should by no means be construed as defining the scope of the invention.

Example 1

In a 0.5 mol/liter aqueous solution of potassium iodide (KI) was dissolved a hydroxypropylcellulose (HPC) with an average substitution degree of 1.8 at a final concentration of 62.5 weight %. The solubility behavior of HPC in water is of the LCST type.

This aqueous HPC/KI solution showed a green color due to its liquid crystallinity but was transparent. Using a Teflon spacer equipped with 500 μm-thick platinum electrodes, the above aqueous HPC/KI solution was sealed between transparent glass substrate sheets (substrate-to-substrate spacing: 500 μm) and a predetermined area of the assemblage was masked with a cover member to leave the one-third region at the negative electrode side exposed for use as the light-shielding or dimming area. The electrode gap of this light screen device was 15 mm.

Then, at a temperature of 20° C., a direct-current voltage of 4.5 V was applied between the platinum electrodes. Following voltage application, opacification began in the solution in the vicinity of the negative electrode and ultimately spread all over the exposed area. This effect was attributed to depression of the clouding point of the solution in the vicinity of the negative electrode due to the formation of an ion gradient by the applied voltage.

Comparative Example

A 62.5 wt. % aqueous HPC solution was prepared in the same manner as in the above Example except that the addition of KI was omitted and using the aqueous solution, a light shielding device was produced. Then, at an ambient temperature of 20° C., a direct-current voltage of 4.5 V was applied between the platinum electrodes. As a result, no change was observed, with the solution remaining to be transparent. Then, the ambient temperature was set to a temperature near the clouding point (about 36° C.) of the HPC solution and an electric field was applied. No change was found in the solution, either.

Example 2

Using lithium thiocyanate (LiSCN), lithium iodide (LiI), lithium nitrate (LiNO$_3$), lithium bromide (LiBr), and lithium chloride (LiCl), 0.5 mol/liter aqueous electrolyte solutions were respectively prepared. In each of those aqueous electrolyte solutions, a hydroxypropylcellulose (HPC) with an average substitution degree of 1.8 was added at a final concentration of 40 weight %. This aqueous HPC/electrolyte solution was sealed between a pair of transparent glass substrate sheets (substrate-to-substrate spacing: 200 μm) and the assemblage was heated at an incremental rate of about 1° C./15 minutes. At the same time, a beam of light having a wavelength of 700 nm was projected in a direction normal to the glass surface and the absorbance of the aqueous HPC/electrolyte solution was measured. The absorbance of the electrolyte-free 40 weight % aqueous HPC solution was also measured in the same manner. The relation of temperature with absorbance is shown in FIG. 5.

Figure 5:
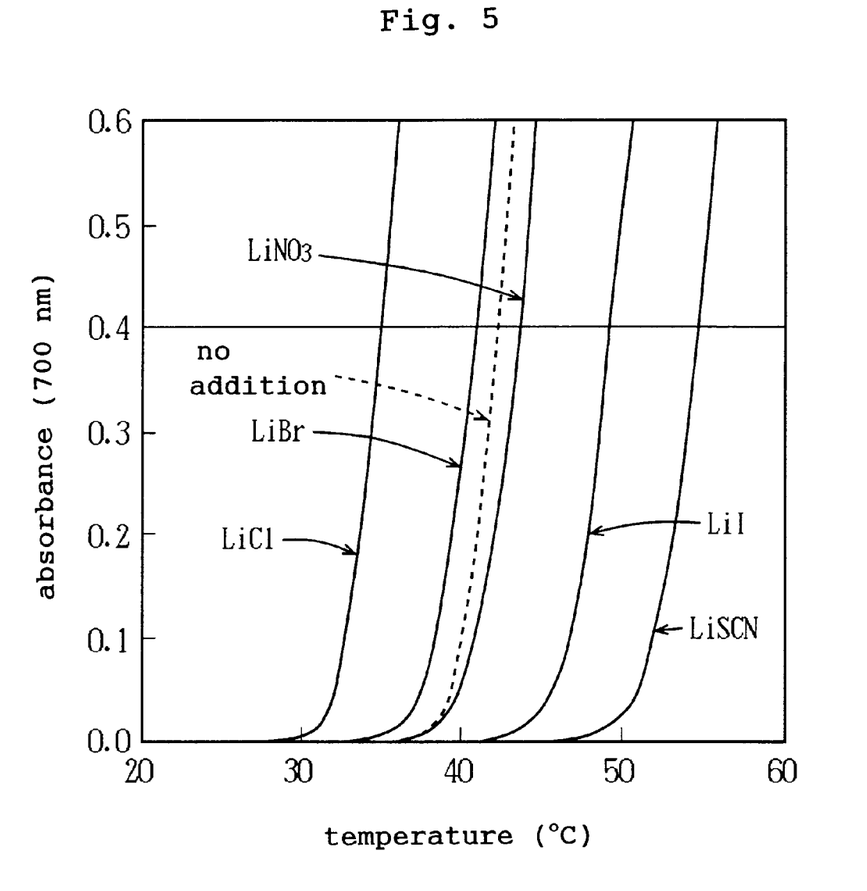
FIG. 5 is a graph showing the relation of temperature with absorbance in Example 2.

It will be apparent from FIG. 5 that the clouding point of the solution was changed to 55° C. when lithium thiocyanate (LiSCN) was added, 49° C. with lithium iodide (LiI), 44° C. with lithium nitrate (LiNO$_3$), 41° C. with lithium bromide (LiBr), and 35° C. with lithium chloride (LiCl). On the other hand, the clouding point of the electrolyte-free aqueous HPC solution was 42° C. Thus, the clouding point of the aqueous HPC solution can be controlled by adding an electrolyte.

What is claimed is:

1. A light shielding device comprising a pair of electrodes and, as hermetically interposed therebetween, an aqueous composition comprising a cellulose ether, an electrolyte, and an aqueous medium having a clouding point.

2. The light shielding device according to claim 1 wherein the cellulose ether is at least one member selected from the group consisting of hydroxyalkyl-celluloses, alkyl-celluloses, hydroxyalkyl-alkyl-celluloses, and cyanoalkyl-celluloses.

3. The light shielding device according to claim 1 wherein the cellulose ether is a hydroxyalkyl-cellulose.

4. The light shielding device according to claim 1 wherein the cellulose ether is a lower consolute temperature (LCST) cellulose ether, the solubility of which is increased with a decreasing temperature, or a higher consolute temperature (HCST) cellulose ether, the solubility of which is increased with an increasing temperature.

5. The light shielding device according to claim 1 wherein the cationic component of the electrolyte is an inorganic cation selected from the group consisting of alkali metal cations and alkaline earth metal cations, and the anionic component of said electrolyte is an inorganic anion selected from the group consisting of thiocyanate anion, halide anions, and inorganic acid anions.

6. The light shielding device according to claim 1 wherein the electrolyte is at least one member selected from the group consisting of lithium salts, sodium salts, potassium salts, cesium salts, and calcium salts.

7. The light shielding device according to claim 1 wherein the aqueous medium has a water content of 50 to 100 weight %.

8. The light shielding device according to claim 1 wherein the clouding point of the aqueous composition is 0 to 100° C.

9. The light shielding device according to claim 1 wherein the aqueous composition comprises 15 to 75 weight % of a cellulose ether, 0.01 to 10 mols/liter of an electrolyte, and an aqueous medium having a water content of 80 to 100 weight %, and has a clouding point of 0 to 80° C.

10. A light-shielding method which comprises applying an electric field to an aqueous composition comprising a cellulose ether, an electrolyte, and an aqueous medium and having a clouding point to thereby clarify or opacify said aqueous composition.

* * * * *